US010240684B2

(12) United States Patent
John et al.

(10) Patent No.: US 10,240,684 B2
(45) Date of Patent: Mar. 26, 2019

(54) VALVE ASSEMBLY HAVING A MANUAL OVERRIDE UNIT

(71) Applicant: HAMILTON SUNDSTRAND CORPORATION, Charlotte, NC (US)

(72) Inventors: Poly Puthur John, Karnataka (IN); Rajiv Krishnappa, Banashankari (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/371,406

(22) Filed: Dec. 7, 2016

(65) Prior Publication Data

US 2017/0370497 A1    Dec. 28, 2017

(30) Foreign Application Priority Data

Jun. 23, 2016   (IN) .............................. 201641021601

(51) Int. Cl.
| | |
|---|---|
| *F16K 31/05* | (2006.01) |
| *F16K 31/60* | (2006.01) |
| *F16K 41/10* | (2006.01) |
| *F16K 1/12* | (2006.01) |
| *F16K 31/06* | (2006.01) |
| *F16K 31/10* | (2006.01) |

(52) U.S. Cl.
CPC .............. *F16K 31/602* (2013.01); *F16K 1/12* (2013.01); *F16K 31/05* (2013.01); *F16K 31/0655* (2013.01); *F16K 31/10* (2013.01); *F16K 41/10* (2013.01)

(58) Field of Classification Search
CPC ........ F16K 1/12; F16K 31/05; F16K 31/0655; F16K 31/602; F16K 41/10

USPC ....................................... 251/129.03, 129.15
See application file for complete search history.

(56) References Cited

U.S. PATENT DOCUMENTS

| | | | | |
|---|---|---|---|---|
| 1,406,333 A | * | 2/1922 | Beach | ..................... B60L 15/34 |
| | | | | 200/82 R |
| 1,786,234 A | * | 12/1930 | Forman | ............... F16K 31/0627 |
| | | | | 251/129.03 |

(Continued)

FOREIGN PATENT DOCUMENTS

| | | |
|---|---|---|
| DE | 1632984 U | 2/1977 |
| FR | 1257143 | 3/1961 |

(Continued)

OTHER PUBLICATIONS

European Search Report for European Patent Application 17176678.5 dated Nov. 2, 2017, 11 pages.

*Primary Examiner* — Seth W. Mackay-Smith
(74) *Attorney, Agent, or Firm* — Cantor Colburn LLP

(57) ABSTRACT

A valve assembly includes a housing, an actuator, a plunger, a cover, a valve body, and a manual override unit. The actuator is received within the housing and is disposed between a first annular wall and a second annular wall. The plunger is movably disposed within a plunger cavity that is defined by the base and the second annular wall. The cover is disposed on the housing. The valve body is connected to the housing. The valve body has an end wall that defines an outlet port, an annular wall that axially extends from the end wall and defines an inlet port, and a flange that extends from the end wall and engages the cover. The manual override unit is operatively connected to the plunger.

6 Claims, 2 Drawing Sheets

(56) References Cited

U.S. PATENT DOCUMENTS

| | | | | |
|---|---|---|---|---|
| 2,239,774 A * | 4/1941 | Blanchard | F22B 37/443 | |
| | | | 137/94 | |
| 2,269,016 A | 1/1942 | Gille | | |
| 2,550,148 A * | 4/1951 | Harding | F15B 13/021 | |
| | | | 137/596.13 | |
| 2,757,688 A * | 8/1956 | Klingler | F16K 11/052 | |
| | | | 137/625.44 | |
| 3,098,635 A * | 7/1963 | Delaporte | F16K 31/0655 | |
| | | | 251/129.17 | |
| 3,351,093 A | 11/1967 | Frantz | | |
| 3,429,340 A | 2/1969 | Opel et al. | | |
| 4,285,496 A * | 8/1981 | Coles | F15B 13/0402 | |
| | | | 192/89.21 | |
| 4,327,892 A * | 5/1982 | Ruyak | F16K 31/088 | |
| | | | 251/129.03 | |
| 4,344,603 A * | 8/1982 | Hozumi | F16K 31/0606 | |
| | | | 137/625.65 | |
| 4,544,128 A | 10/1985 | Kolchinsky et al. | | |
| 4,603,832 A * | 8/1986 | Sjoquist | A01G 25/16 | |
| | | | 251/129.03 | |
| 4,709,619 A * | 12/1987 | Bartholomaus | H01F 7/1607 | |
| | | | 251/129.03 | |
| 4,941,504 A | 7/1990 | Beauvir | | |
| 5,358,213 A * | 10/1994 | Pilolla | E03C 1/055 | |
| | | | 137/625.17 | |
| 5,513,832 A * | 5/1996 | Becker | F16K 31/0624 | |
| | | | 137/82 | |
| 5,529,281 A * | 6/1996 | Brudnicki | F16K 1/123 | |
| | | | 251/129.03 | |
| 5,558,311 A * | 9/1996 | Connolly | B60R 16/0207 | |
| | | | 251/129.15 | |
| 5,641,148 A * | 6/1997 | Pena | F16K 31/0668 | |
| | | | 251/129.07 | |
| 5,791,630 A * | 8/1998 | Nakao | F02M 23/006 | |
| | | | 251/129.15 | |
| 5,810,030 A * | 9/1998 | Uchiyama | F16K 31/0655 | |
| | | | 137/468 | |
| 5,897,096 A * | 4/1999 | Nakano | F02M 3/075 | |
| | | | 251/129.15 | |
| 5,918,635 A * | 7/1999 | Wang | F16K 31/0693 | |
| | | | 137/625.65 | |
| 6,036,447 A * | 3/2000 | Kawaguchi | F04B 27/1804 | |
| | | | 251/129.02 | |
| 6,182,646 B1 * | 2/2001 | Silberstein | F02M 26/48 | |
| | | | 123/568.26 | |
| 6,182,684 B1 | 2/2001 | Frankenberg | | |
| 6,352,240 B1 * | 3/2002 | Eckstein | A61G 7/018 | |
| | | | 137/636.1 | |
| 6,405,755 B1 * | 6/2002 | Doehla | F16K 31/0679 | |
| | | | 137/596.17 | |
| 6,527,248 B1 * | 3/2003 | Muller | F16K 31/0658 | |
| | | | 251/111 | |
| 6,557,823 B2 * | 5/2003 | Sakai | F15B 13/0402 | |
| | | | 251/129.01 | |
| 6,581,904 B2 * | 6/2003 | Watanabe | F16K 31/0655 | |
| | | | 251/129.01 | |
| 6,612,544 B2 * | 9/2003 | Sakata | F01L 1/34 | |
| | | | 251/129.15 | |
| 6,740,827 B1 | 5/2004 | Liantonio | | |
| 6,863,255 B2 * | 3/2005 | Watanabe | F16K 31/0655 | |
| | | | 251/129.21 | |
| 7,270,310 B2 * | 9/2007 | Takakura | F16K 24/04 | |
| | | | 251/30.04 | |
| 7,275,732 B2 * | 10/2007 | Kato | F16K 31/0655 | |
| | | | 251/129.15 | |
| 7,414,502 B2 * | 8/2008 | Tackes | F16K 31/0668 | |
| | | | 251/129.15 | |
| 7,591,281 B2 * | 9/2009 | Tsuge | F16K 31/0655 | |
| | | | 137/495 | |
| 8,066,256 B2 | 11/2011 | Platz et al. | | |
| 9,016,663 B2 * | 4/2015 | Moreno | F16K 27/029 | |
| | | | 251/129.15 | |
| 2003/0062502 A1 * | 4/2003 | Knobbe | F16K 3/0254 | |
| | | | 251/326 | |
| 2004/0099831 A1 | 5/2004 | Liantonio | | |
| 2005/0035321 A1 * | 2/2005 | Uemura | F04B 27/1804 | |
| | | | 251/129.03 | |
| 2006/0043324 A1 | 3/2006 | Kingsford et al. | | |
| 2009/0179164 A1 * | 7/2009 | Higashidozono | F04B 27/1804 | |
| | | | 251/129.03 | |
| 2009/0272924 A1 * | 11/2009 | Wingett | F16K 1/36 | |
| | | | 251/85 | |
| 2010/0019179 A1 * | 1/2010 | Nguyen | H01F 5/00 | |
| | | | 251/129.15 | |
| 2014/0311440 A1 * | 10/2014 | Lee | F01M 1/16 | |
| | | | 123/196 CP | |
| 2015/0048270 A1 * | 2/2015 | Bamber | H01F 7/081 | |
| | | | 251/129.15 | |

FOREIGN PATENT DOCUMENTS

| | | |
|---|---|---|
| JP | H04262183 A | 9/1992 |
| JP | H10169829 A | 6/1998 |
| JP | 2010261591 A | 11/2010 |

* cited by examiner

VALVE ASSEMBLY HAVING A MANUAL OVERRIDE UNIT

CROSS-REFERENCE TO RELATED APPLICATIONS

This application claims the benefit of Indian application no. 201641021601 filed Jun. 23, 2016, which is incorporated herein by reference in its entirety.

BACKGROUND

Solenoid operated valves provide on/off and proportional flow controls in fluid systems. Linear direct acting on/off solenoids are commonly used in such solenoid operated valves. The linear direct acting on/off solenoid valve may include a pressure balancing design feature. Pressure balancing features may involve the use of dynamic seals with an O-ring attached to a valving element. The O-ring seal may degrade during operation of the solenoid operated valve.

Solenoid operated valves used in environments without a fluid medium may use metal to metal seating. The metal to metal seating may degrade due to solid particles becoming generated by the sliding where of the solenoid during repeated cycling movements.

Accordingly it is desirable to provide a more robust solenoid operated valve.

BRIEF DESCRIPTION

According to an embodiment of the present disclosure, a valve assembly is provided. The valve assembly includes a housing, an actuator, a plunger, a cover, a valve body, and a manual override unit. The housing has a base that defines a base opening, a first annular wall that extends from the base, and a second annular wall spaced apart from the first annular wall and extends from the base. The actuator is received within the housing and is disposed between the first annular wall and the second annular wall. The plunger is movably disposed within a plunger cavity that is defined by the base and the second annular wall. The cover is disposed on the housing and defines a cover opening. The valve body is connected to the housing. The valve body has an end wall that defines an outlet port, an annular wall that axially extends from the end wall and defines an inlet port, and a flange that extends from the end wall and engages the cover. The manual override unit is operatively connected to the plunger.

According to another embodiment of the present disclosure, a valve assembly is provided. The valve assembly includes a housing, a valve body, an actuator, a valve poppet, a stem, a pivot member, and a lever. The housing has a base that defines a base opening. The valve body is disposed on the housing and defines an inlet port and an outlet port. The actuator is operatively connected to a plunger that is disposed within the housing. The valve poppet extends from the plunger and extends into the valve body. The valve poppet is movable between an extended position in which the valve poppet inhibits fluid flow through the outlet port and a retracted position that permits fluid flow through the outlet port. The stem extends from the plunger and through the base opening. The stem defines a slot that is spaced apart from an end surface of the base. The pivot member is disposed on the base. The lever is pivotally connected to the pivot member and is at least partially received within the slot.

According to yet another embodiment of the present disclosure, a method is provided. The method includes providing a valve assembly having a housing that includes a base defining a base opening, a valve body disposed on the housing, an actuator operatively connected to a plunger disposed within the housing, and a valve poppet extending from the plunger. The method further includes providing a manual override unit that is operatively connected to the plunger. The method still further includes actuating the manual override unit to move the valve assembly from a closed position towards an open position.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
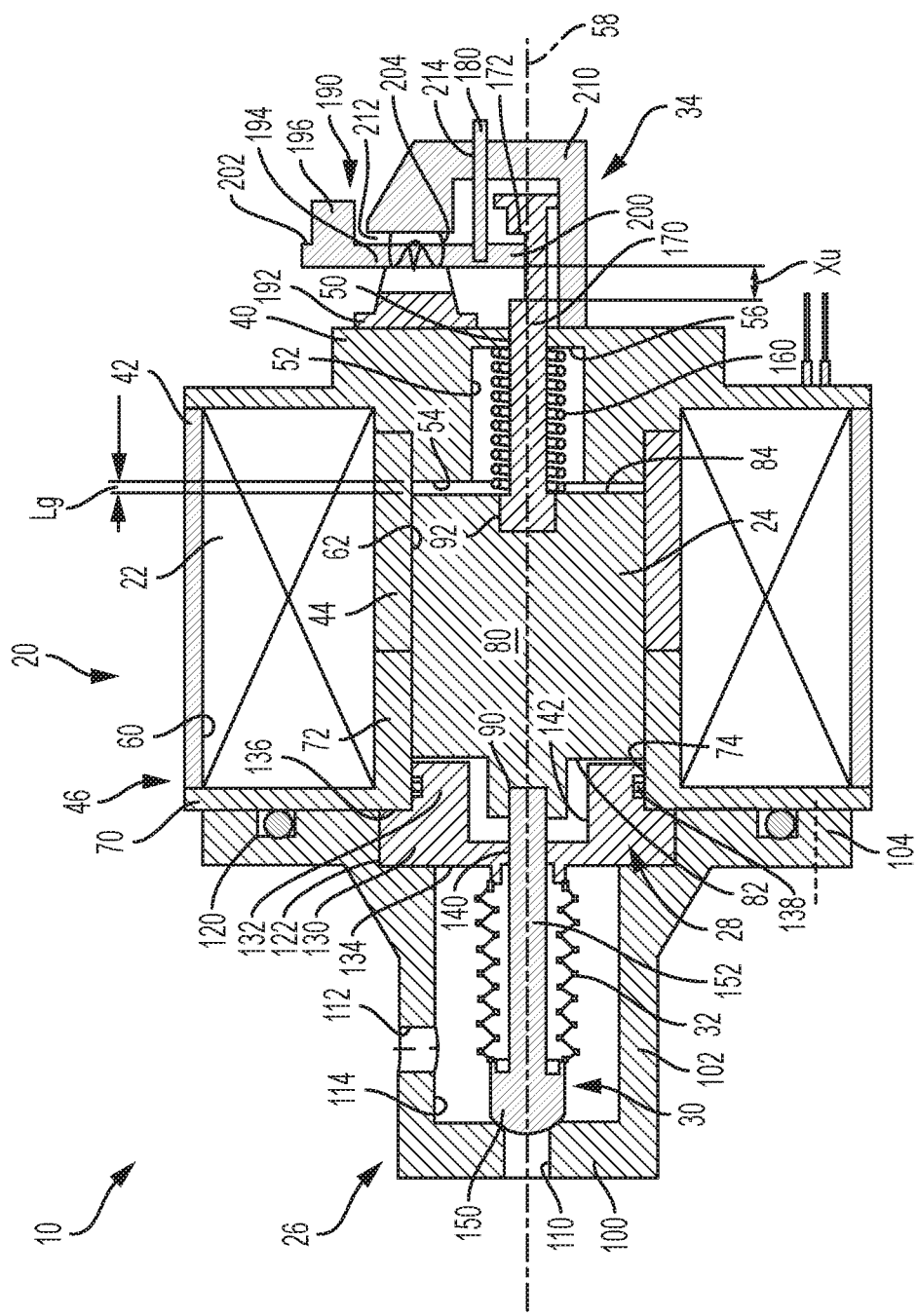
FIG. 1 is a partial cross-sectional view of a valve assembly in a closed position.
Figure 2:
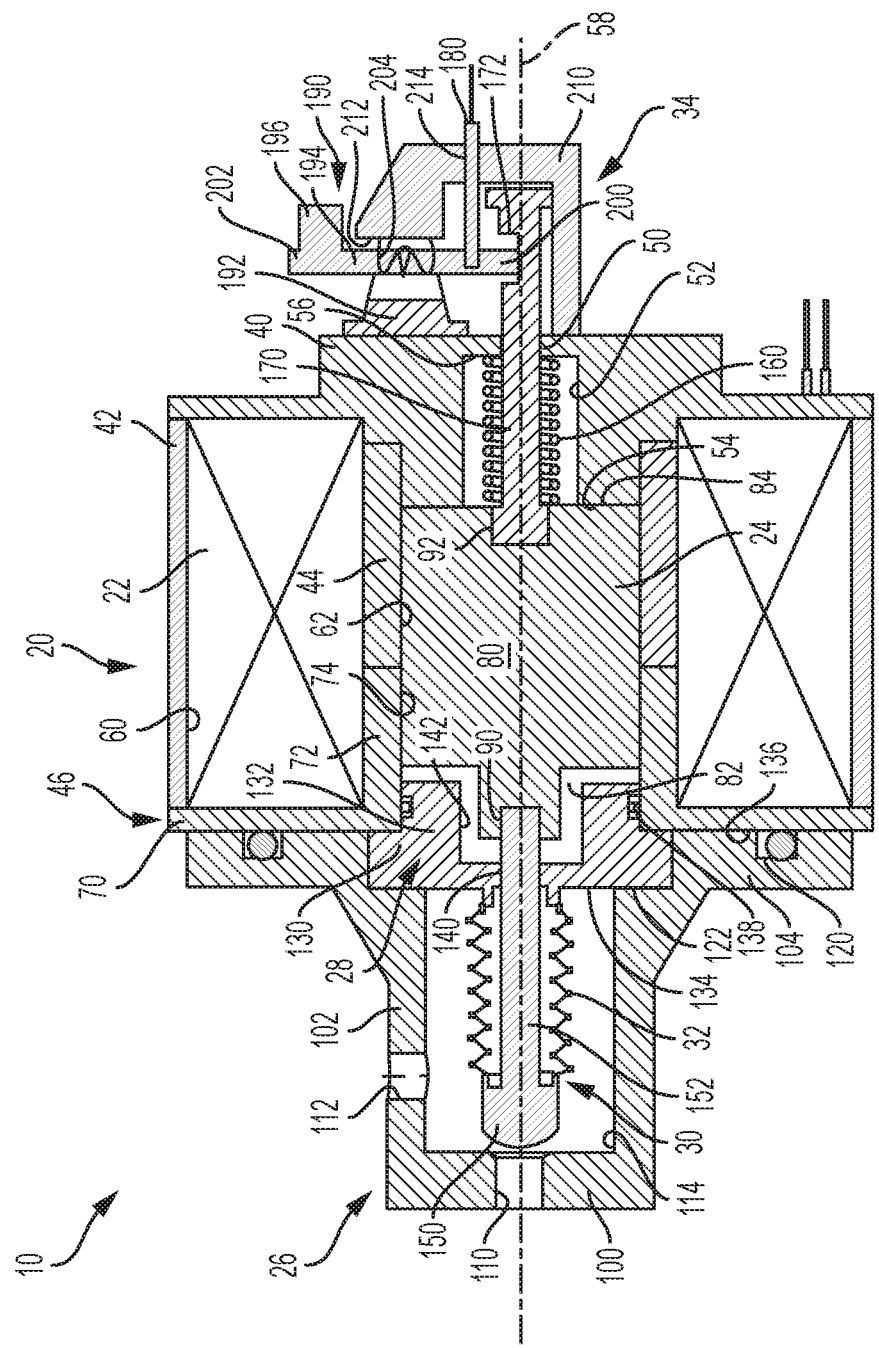
FIG. 2 is a partial cross-sectional view of the valve assembly in an open position.

Referring to FIGS. 1 and 2, a cross-sectional view of a valve assembly 10 movable between a closed position and an open position is shown. The valve assembly 10 may be installed in a fluid pathway and is configured to selectively enable fluid flow within the fluid pathway. The valve assembly 10 may be a direct acting tubular solenoid shutoff valve. The valve assembly 10 includes a housing 20, an actuator 22, a plunger 24, a valve body 26, a spacer 28, a valve poppet 30, a bellows 32, and a manual override unit 34.

The housing 20 is configured to receive a plurality of valve assembly components. The housing 20 includes a base 40, a first annular wall 42, and a second annular wall 44. The base 40 defines a base opening 50 and a base cavity 52 disposed substantially concentrically with the base opening 50. The base opening 50 that extends completely through an aft portion of the base 40. The base cavity 52 may be configured as a counterbore that extends from an end face 54 of the base 40 towards a seating face 56 of the base 40 along an axis 58.

The first annular wall 42 extends from the base 40 along the axis 58. The first annular wall 42 forms an outer wall of the housing 20. The second annular wall 44 extends from the base 40 along the axis 58. The second annular wall 44 is disposed substantially concentrically with and is disposed radially inward from the first annular wall 42. The second annular wall 44 forms an inner wall of the housing 20. The second annular wall 44 is joined to the base 40.

The base 40, the first annular wall 42, and the second annular wall 44 define an actuator cavity 60 and a plunger cavity 62. The actuator cavity 60 and the plunger cavity 62 are separated from each other by the second annular wall 44.

The cover 46 is disposed over the actuator cavity 60. The cover 46 includes a first wall 70 and a second wall 72. The first wall 70 is disposed substantially transverse to the axis 58. The first wall 70 extends from the first annular wall 42 towards the second annular wall 44. The second wall 72 is disposed substantially parallel to the axis 58. The second wall 72 extends from the first wall 70 towards an end of the second annular wall 44. In at least one embodiment, the first wall 70 is joined to the first annular wall 42 and the second wall 72 is joined to the second annular wall 44.

The second wall 72 of the cover 46 defines a cover opening 74 that is disposed about the axis 58. The cover opening 74 is disposed substantially coaxially with the base opening 50 and the base cavity 52. The cover opening 74 is configured as an extension of the plunger cavity 62.

The actuator cavity 60 is selectively accessed by the removal of the first annular wall 42. The actuator 22 is received within the actuator cavity 60 and is disposed between the base 40, the first annular wall 42, the second annular wall 44, and the cover 46. The actuator 22 is configured as a solenoid coil, or the like.

The plunger 24 is received within at least one of the plunger cavity 62 and the cover opening 74. The plunger 24 is movably disposed within at least one of the plunger cavity 62 and the cover opening 74. The plunger 24 includes a plunger body 80 extending between a first plunger end 82 and a second plunger end 84 disposed opposite the first plunger end 82.

The first plunger end 82 is disposed proximate the first wall 70 of the cover 46. The first plunger end 82 defines a first mounting feature 90 that extends from the first plunger end 82 through the cover opening 74. The second plunger end 84 defines a second mounting feature 92 that extends from the second plunger end 84 towards the first plunger end 82.

The plunger 24 is movable between a first position and a second position in response to the selective activation of the actuator 22. The first position corresponds to a closed position of the valve assembly 10. The second position corresponds to an open position of the valve assembly 10.

The second plunger end 84 of the plunger 24 is spaced apart from the end face 54 of the base 40 while the plunger 24 is in the first position. The spacing apart of the second plunger end 84 of the plunger 24 and the end face 54 of the base 40 defines an air gap, having an air gap length Lg. The second plunger end 84 of the plunger 24 engages the end face 54 of the base 40 while the plunger 24 is in the second position.

The valve body 26 is connected to the first wall 70 of the cover 46 of the housing 20. The valve body 26 includes an end wall 100, an annular wall 102, and a flange 104. The end wall 100 is disposed substantially parallel to the first wall 70 of the cover 46 and the base 40. The end wall 100 defines an outlet port 110 that extends completely through the end wall 100. The outlet port 110 is disposed coaxially with the cover opening 74, the base cavity 52, and the base opening 50.

The annular wall 102 extends from the end wall 100 towards the flange 104 and the housing 20. The annular wall 102 is disposed about the axis 58. The annular wall 102 defines an inlet port 112. The end wall 100 and annular wall 102 define a valve cavity 114. The valve cavity 114 fluidly connects the outlet port 110 and the inlet port 112.

The flange 104 extends radially from an end of the annular wall 102. The flange 104 is configured to engage the first wall 70 of the cover 46 of the housing 20. The flange 104 defines a groove 120 configured to receive a sealing member such as an O-ring. A notch 122 is defined between the intersection of the annular wall 102 and the flange 104.

The spacer 28 is disposed between the cover 46 of the housing 20 and the valve body 26. The spacer 28 includes a first portion 130 and a second portion 132 extending from the first portion 130. The first portion 130 is at least partially received within the notch 122. The first portion 130 includes a first face 134 that engages a portion of the annular wall 102 of the valve body 26 disposed proximate the notch 122 and a second face 136 that engages the first wall 70 of the cover 46.

The second portion 132 extends from the first portion 130 and is at least partially received within the cover opening 74. The second portion 132 define an annular groove 138 configured to receive a sealing member such as an O-ring that engages the second wall 72 of the cover 46 of the housing 20.

The spacer 28 defines a spacer opening 140 and a spacer cavity 142. The spacer opening 140 extends at least partially through the first portion 130 of the spacer 28. The spacer opening 140 is disposed substantially coaxially with the outlet port 110, the spacer cavity 142, the base opening 50, and the base cavity 52. The spacer cavity 142 is configured as a counterbore of the spacer opening 140. The spacer cavity 142, the spacer opening 140, the cover opening 74, the base cavity 52, and the base opening 50 are proximately aligned along the axis 58.

The valve poppet 30 is movable between an extended position and a retracted position. The extended position corresponds to the first position of the plunger 24 and the closed position of the valve assembly 10. The valve poppet 30 includes a valve head 150 and a valve stem 152. The valve head 150 of the valve poppet 30 is seated against a valve seat of the outlet port 110 of the end wall 100 of the valve body 26 to inhibit fluid flow through the outlet port 110. The retracted position corresponds to the second position of the plunger 24 and the open position of the valve assembly 10. The valve head 150 of the valve poppet 30 is spaced apart from the valve seat of the outlet port 110 of the end wall 100 of the valve body 26 to facilitate or permit fluid flow from the inlet port 112, through the valve cavity 114, and out of the outlet port 110.

The valve stem 152 extends from the valve head 150 and is operatively connected to the first plunger end 82 of the plunger body 80 of the plunger 24. The valve stem 152 extends through the spacer opening 140 and the spacer cavity 142 and is received within the first mounting feature 90. The valve stem 152 is force fit into the first mounting feature 90 or secured within the first mounting feature 90 by a shear pin that extends through the first mounting feature 90 and the valve stem 152.

The bellows 32 is connected to the valve head 150 of the valve poppet 30 and the spacer 28. The bellows 32 is joined to an end of the valve head 150 of the valve poppet 30 and the first face 134 of the first portion 130 of the spacer 28. The bellows 32 is configured to function as a dynamic hermetic seal to isolate the plunger cavity 62 from the working fluid that may pass through the inlet port 112 and the outlet port 110 of the valve body 26. The bellows 32 is a metallic bellow having an effective area substantially similar to the valve head 150 seating area to balance the fluid pressure at various operating pressures of the valve assembly 10.

In at least one embodiment, a biasing member 160 is provided. The biasing member 160 is received within the base cavity 52. The biasing member 160 is configured to engage the seating face 56 of the base 40 and the second plunger end 84 of the plunger 24 to bias the plunger 24 towards the first position, to bias the valve poppet 30 towards the extended position, and thus to bias the valve assembly 10 towards the closed position. During operation of the valve assembly 10, the actuator 22 is selectively energized to move the plunger 24 between the first position and the second position to move the valve assembly 10 between the closed and open positions. The valve assembly 10 may be manually moved between the closed position and the open position by use of the manual override unit 34.

The manual override unit 34 includes a stem 170 that is operatively connected to the plunger 24. The stem 170 is operatively connected to the second plunger end 84 and is received within the second mounting feature 92. The stem 170 may be pinned or force fit into the second mounting feature 92. The stem 170 extends through the base cavity 52 and the base opening 50. In at least one embodiment, a sliding seal is disposed about the stem 170 within the base opening 50 to maintain the hermetic seal within the plunger cavity 62. The biasing member 160 is disposed about the stem 170.

The stem 170 defines a slot 172. The slot 172 is spaced apart from an end surface of the base 40 that is disposed opposite the seating face 56.

The stem 170 may be actuated to move the valve assembly 10 between the closed position and the open position by the application of a linear force along the axis 58 to an end of the stem 170. A cable 180 may be operatively connected to an end of the stem 170. The cable 180 may be a push pull cable that is configured to pull the stem 170 to move the plunger 24 between the first position and the second position.

The stem 170 may be actuated by a lever assembly 190 to move the valve assembly 10 between the closed position and the open position. The lever assembly 190 includes a pivot member 192, a lever 194, and a collar 196. The pivot member 192 is disposed on the end surface of the base 40.

The lever 194 is pivotally connected to the pivot member 192. The lever 194 includes a first lever end 200 that is at least partially received within the slot 172 and a second lever end 202. The first lever end 200 and the second lever end 202 of the lever 194 are disposed transverse to the axis 58. The slot 172 has a slot length, Xu, that defines a gap between a portion of the first lever end 200. The gap, Xu, is larger than the air gap length, Lg, when the plunger 24 is in the first position. The lever 194 is pivotally connected to the pivot member 192 at a point disposed between the first lever end 200 and the second lever end 202. In at least one embodiment, a torsion spring 204 is disposed about a pin that extends through the pivot member 192.

The collar 196 is disposed on the second lever end 202. The application of an input force onto the collar 196 pivots the lever 194 about a pivot point defined by the pivot member 192 and the lever 194 engages an end of the slot 172 of the stem 170 to move the plunger 24 between the first position and the second position to move the valve poppet 30 between the extended position and the retracted position to move the valve assembly 10 between the closed position and the open position.

In at least one embodiment, the cable 180 is connected to a portion of the lever 194. The pulling of the cable 180 along the axis 58 pivots the lever 194 to move the plunger 24 between the first position and the second position to move the valve poppet 30 between the extended position and the retracted position to move the valve assembly 10 between the closed position and the open position.

In at least one embodiment, a cover 210 is disposed over the lever assembly 190. The cover 210 defines an opening 212 that at least a portion of the lever 194 and the collar 196 extends through. In other embodiments, the cover 210 defines a second opening 214 through which the cable 180 extends. The cover 210 protects the lever assembly 190 of the mechanical override unit 34 from external contaminants.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A valve assembly, comprising:
a housing having a base defining a base opening;
a valve body disposed on the housing, the valve body defining an inlet port and an outlet port;
an actuator operatively connected to a plunger disposed within the housing;
a valve poppet extending from the plunger and extending into the valve body, the valve poppet being movable between an extended position in which the valve poppet inhibits fluid flow through the outlet port and a retracted position that permits fluid flow through the outlet port;
a stem extending from the plunger and through the base opening, the stem defining a slot spaced apart from an end surface of the base;
a pivot member disposed on the base;
a lever pivotally connected to the pivot member and at least partially received within the slot
a spacer disposed between the valve body and the housing, the spacer defining a spacer opening disposed coaxially with the outlet port, and the base opening;
a bellows having a first end joined to a valve head of the valve poppet and a second end connected to a first face of the spacer;
a biasing member that engages the plunger and the base, the biasing member configured to bias the valve poppet towards the extended position; and
a torsion spring disposed about a pin extending through the lever to pivotally connect the lever to the pivot member.

2. The valve assembly of claim 1, further comprising a cable operatively connected to the lever, the cable being configured to pivot the lever to move the valve poppet between a first position and a second position.

3. The valve assembly of claim 2, further comprising a collar disposed on an end of the lever and disposed substantially parallel to the stem, wherein in response to an input applied to the collar, the lever pivots to move the valve poppet between a first position and a second position.

4. A valve assembly, comprising:
a housing having a base defining a base opening;

a valve body disposed on the housing, the valve body defining an inlet port and an outlet port;

an actuator operatively connected to a plunger disposed within the housing;

a valve poppet extending from the plunger and extending into the valve body, the valve poppet being movable between an extended position in which the valve poppet inhibits fluid flow through the outlet port and a retracted position that permits fluid flow through the outlet port;

a stem extending from the plunger and through the base opening, the stem defining a slot spaced apart from an end surface of the base;

a pivot member disposed on the base;

a lever pivotally connected to the pivot member and at least partially received within the slot;

a spacer disposed between the valve body and the housing, the spacer defining a spacer opening disposed coaxially with the outlet port, and the base opening;

a bellows having a first end connected to a valve head of the valve poppet and a second end connected to a first face of the spacer, the bellows has an effective area that is substantially similar to a seating area of the valve head;

a biasing member that engages the plunger and the base, the biasing member configured to bias the valve poppet towards the extended position; and a torsion spring disposed about a pin extending through the lever to pivotally connect the lever to the pivot member.

5. The valve assembly of claim 4, further comprising a cable operatively connected to the lever, the cable being configured to pivot the lever to move the valve poppet between a first position and a second position.

6. The valve assembly of claim 5, further comprising a collar disposed on an end of the lever and disposed substantially parallel to the stem, wherein in response to an input applied to the collar, the lever pivots to move the valve poppet between a first position and a second position.

* * * * *